(12) United States Patent
Linz et al.

(10) Patent No.: US 6,611,564 B1
(45) Date of Patent: Aug. 26, 2003

(54) METHOD FOR CONSERVING POWER IN TRANSCEIVERS

(75) Inventors: Alfredo R. Linz, Austin, TX (US); Terry L. Cole, Austin, TX (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/243,391

(22) Filed: Feb. 1, 1999

(51) Int. Cl.[7] .................................................. H04B 1/38
(52) U.S. Cl. ....................... 375/295; 375/377; 714/792; 370/468
(58) Field of Search ................................. 375/219, 220, 375/224, 295, 316, 354, 356, 308, 261, 262, 298; 370/465–473; 714/468

(56) References Cited

U.S. PATENT DOCUMENTS 6,049,535 A * 4/2000 Ozukturk et al. ........... 370/335
6,307,868 B1 * 10/2001 Rakib et al. ................ 370/485
6,480,475 B1 * 11/2002 Modlin et al. .............. 370/294

* cited by examiner

*Primary Examiner*—Tesfaldet Bocure
*Assistant Examiner*—Pankaj Kumar
(74) *Attorney, Agent, or Firm*—Williams, Morgan & Amerson

(57) ABSTRACT

A method and apparatus are provided for delivering data within a frame to a peer station, the frame having at least a first and a second symbol. The method comprises determining whether the data in the first symbol is greater than or equal to a coding-gain threshold, loading at least a portion of the data within at least the second symbol in response to determining the data in the first symbol is greater than or equal to the coding-gain threshold to provide a new frame, and transmitting the new frame.

17 Claims, 11 Drawing Sheets

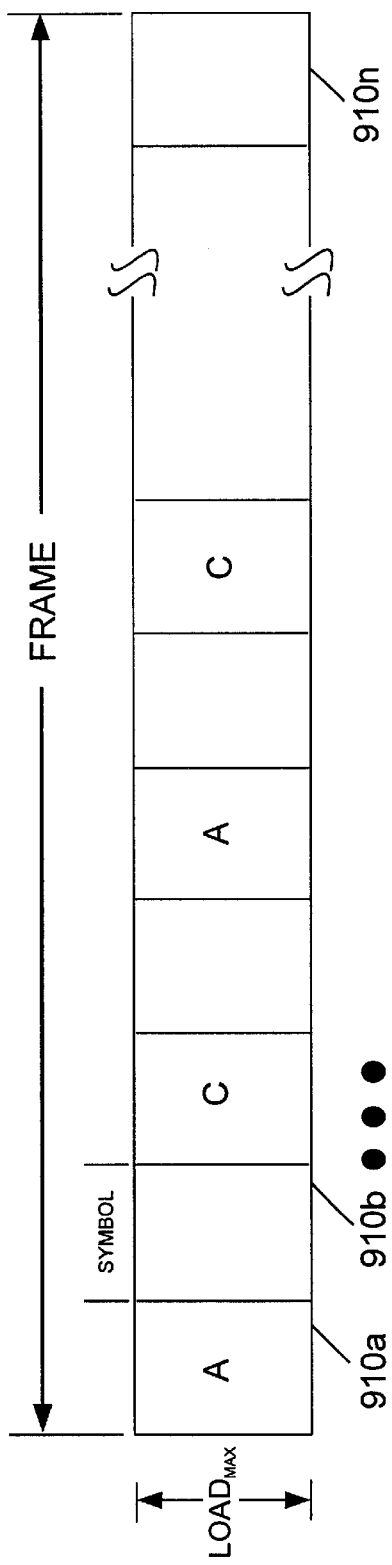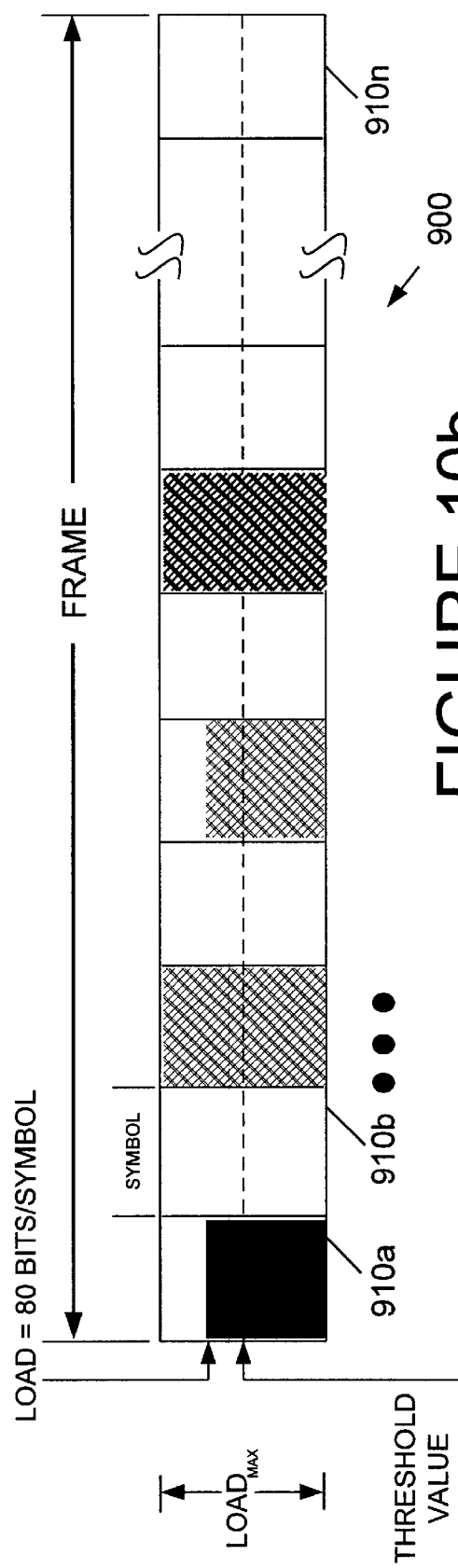

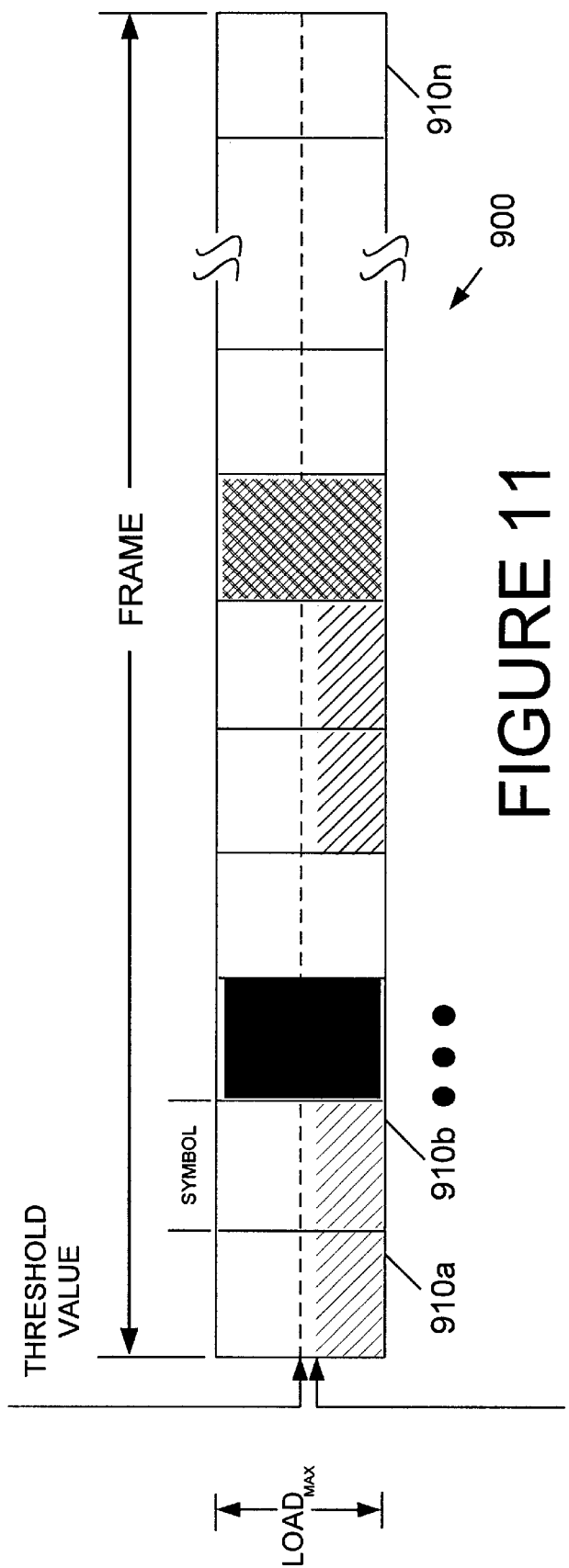

METHOD FOR CONSERVING POWER IN TRANSCEIVERS

BACKGROUND OF THE INVENTION

1. Field of the Invention

This invention relates generally to communications systems, and, more particularly, to a method for conserving power in transceivers utilized in communications systems.

2. Description of the Related Art

In communications systems, particularly telephony, it is common practice to transmit signals between a subscriber station and a central switching office via a two-wire, bidirectional communication channel. A line card generally connects the subscriber station to the central switching office. The primary functions of the line card range from supplying talk battery to performing impedance matching to handling ringing signal, voice and data signals, and testing signals. Until recently, line cards generally supported only the Plain Old Telephone System (POTS). However, a recent trend has been to utilize line cards to support protocols for transmission of digital data.

The Plain Old Telephone System, designed primarily for voice communication, provides an inadequate data transmission rate for many modem applications. To meet the demand for high-speed communication, designers sought innovative and cost-effective solutions that would take advantage of the existing network infrastructure. Several technological advancements have been proposed that make use of the existing network of telephone wires. The most promising of these technologies is the xDSL technology.

DSL is making the existing network of telephone lines more robust and versatile. Once considered virtually unusable for broadband communications, an ordinary twisted pair equipped with DSL interfaces can transmit videos, television, and very high-speed data. The fact that more than six hundred million telephone lines exist around the world is a compelling reason that these lines will serve as the primary transmission conduits for at least several more decades. Because DSL utilizes telephone wiring already installed in virtually every home and business in the world, it has been embraced by many as one of the more promising and viable options.

DSL technologies leave Plain Old Telephone Service undisturbed. Traditional analog voice band interfaces, on the other hand, use the same frequency band, 300 Hertz (Hz)–4 Kilohertz (kHz), as telephone service, thereby preventing concurrent voice and data use. A DSL interface operates at frequencies above the voice channels from about 30 kHz to 1.1 Megahertz (MHz). Thus, a single DSL line is capable of offering simultaneous channels for both voice and data.

DSL systems use digital signal processing (DSP) to increase throughput and signal quality through common copper telephone wire. It provides a downstream data transfer rate from the DSL Point-of-Presence (POP) to the subscriber location at speeds of up to 8 Megabits per second (MBPS). Even a more modest transfer rate of 1.5 MBPS, for instance, is fifty times faster than a conventional 28.8 kilobits per second (KBPS).

One popular version of the DSL technology is the Asymmetrical Digital Subscriber Line (ADSL) technology. The ADSL standard is described in ANSI T1.413 Issue 2, entitled, "Interface Between Networks and Customer Installation—Asymmetric Digital Subscriber Line (ADSL) Metallic Interface," Rev. R6, dated Sep. 26, 1997, incorporated herein by reference in its entirety.

ADSL modems use two competing modulation schemes: discrete multi-tone (DMT) and carrierless amplitude/phase modulation (CAP). DMT is the standard adopted by the American National Standards Institute.

The technology employed by DMT ADSL modems is termed discrete multi-tone. The standard defines 256 discrete tones. Each tone represents a carrier signal that can be modulated with a digital signal for transmitting data. The specific frequency for a given tone is 4.3125 kHz times the tone number. Tones 1–7 are reserved for the voice band and guard bands (i.e., tone 1 is the voice band and tones 2–7 are the guard bands). Data is not transmitted near the voice band to allow for simultaneous voice and data transmission on a single line. The guard bands help isolate the voice band from the ADSL data bands. Typically, a splitter may be used to isolate any voice band signal from the data tones. Tones 8–32 are used to transmit data upstream (i.e., from the user), and tones 33–256 are used to transmit data downstream (i.e., to the user). Alternatively, all the data tones 8–256 may be used for downstream data, and upstream data present on tones 8–32 would be detected using echo cancellation. Because more tones are used for downstream communication than for upstream communication, the transfer is said to be asymmetric.

Through a training procedure, the modems on both sides of the connection sense and analyze which tones are less affected by impairments in the telephone line. Each tone that is accepted is used to carry information. Accordingly, the maximum capacity is set by the quality of the telephone connection. The maximum data rate defined by the ADSL specification, assuming all tones are used, is about 8 MBPS downstream and about 640 KBPS upstream.

Today's DMT ADSL modems are generally designed to deliver data at high speeds. To support higher data transmission rates, these modem-day modems employ powerful, but computationally taxing, algorithms, such as Trellis Coded Modulation (TCM), for example. While today's modems operate efficiently at maximum capacity, they, however, suffer from at least one shortcoming in that they have a tendency to expend more processing power than what is necessary when operating at less than maximum capacity.

The present invention is directed to overcoming, or at least reducing the effects of, one or more of the problems set forth above.

SUMMARY OF THE INVENTION

In one aspect of the present invention, a method is provided for delivering data within a frame to a peer station, the frame having at least a first and a second symbol. The method comprises determining whether the data in the first symbol is greater than or equal to a coding-gain threshold, loading at least a portion of the data within at least the second symbol in response to determining the data in the first symbol is greater than or equal to the coding-gain threshold to provide a new frame, and transmitting the new frame.

In one aspect of the present invention, an apparatus is provided for delivering data to a peer station within a frame having at least a first and a second symbol. The apparatus comprises a controller and a transmitter. The controller is capable of determining whether the data in the first symbol is greater than or equal to a coding-gain threshold and loading at least a portion of the data within at least the second symbol in response to determining the data in the first symbol is greater than or equal to the coding-gain threshold to provide a new frame. The transmitter is capable of transmitting the new frame.

BRIEF DESCRIPTION OF THE DRAWINGS

The invention may be understood by reference to the following description taken in conjunction with the accompanying drawings, in which like reference numerals identify like elements, and in which:

FIGS. 10a and 10b illustrate an exemplary utilization of the DMT frame of FIG. 9; and FIG. 11 illustrates an exemplary reallocation of data within the DMT frame of FIG. 9 in accordance with the present invention.

Figure 1:
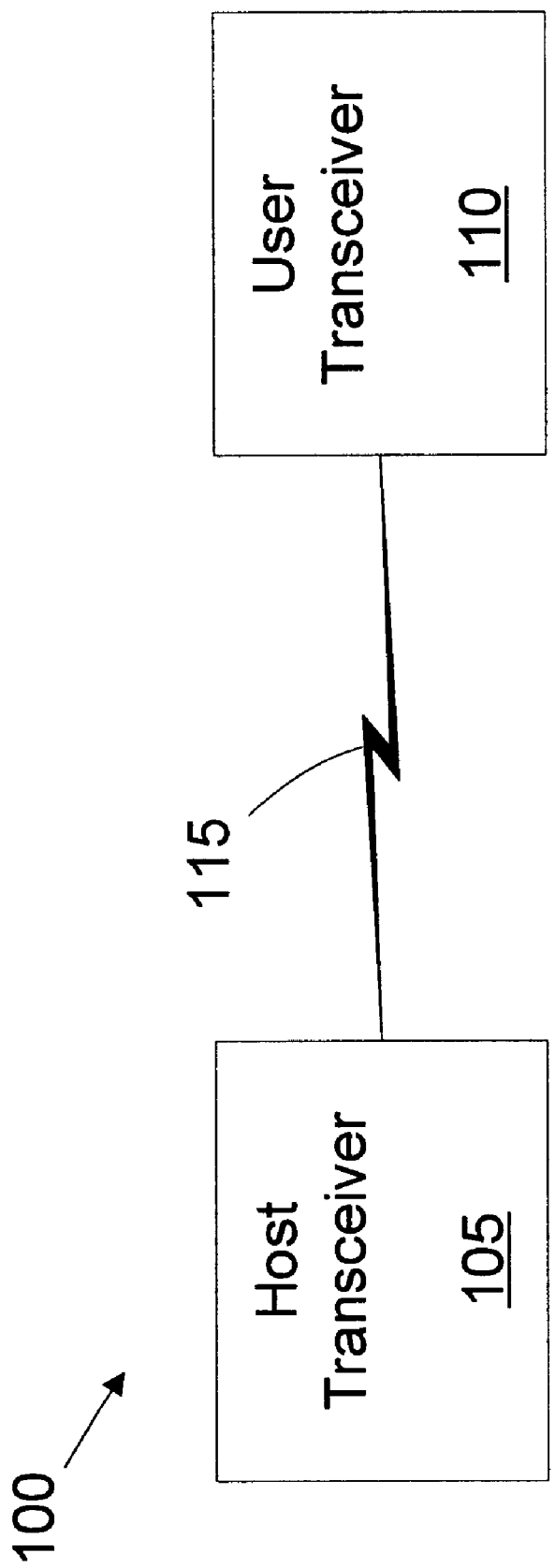
FIG. 1 illustrates a stylized block diagram of a communications system in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to the drawings, and in particular to FIG. 1, a communications system 100 in accordance with the present invention is illustrated. The communications system 100 includes a host transceiver 105 and a user transceiver 110 capable of communicating with each other over a connection 115. The connection 115 may be either a wireline connection or a wireless connection, depending on the application. Generally, the host and user transceivers 105, 110 communicate with each other using a common communications protocol (i.e., a communications standard such as ADSL, ISDN, DECT, TCP/IP, etc.) that defines the transmission parameters, such as the format of data to be transmitted, error checking algorithm, retransmission scheme, and the like. The host and user transceivers 105, 110 may be a pair of modems, fax machines, cellular phones, or any other devices capable of communicating with each other.

Figure 2:
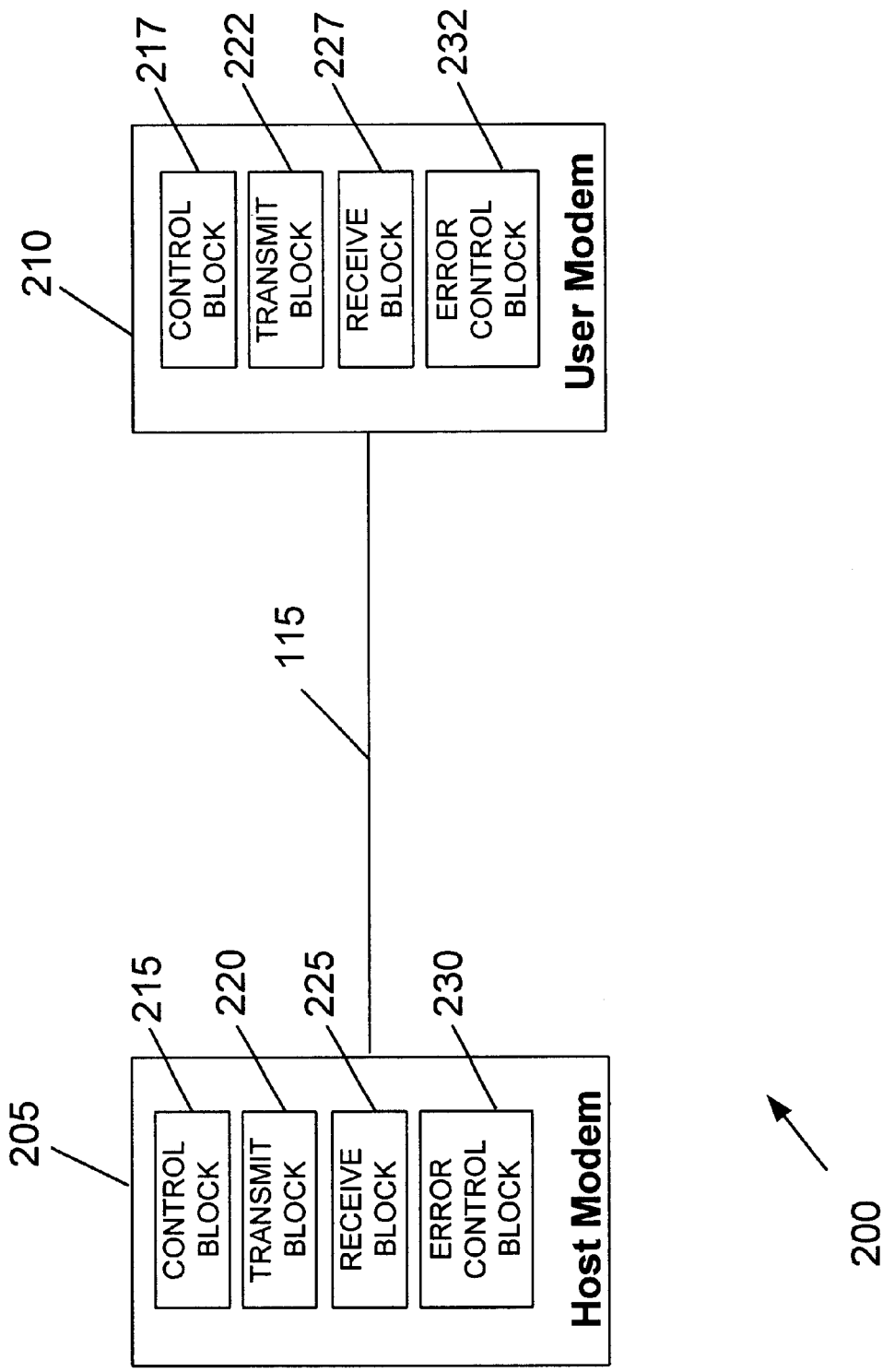
FIG. 2 depicts a stylized block diagram of a specific embodiment of the communications system of FIG. 1 in accordance with the present invention.

FIG. 2 illustrates a stylized block diagram of a communications system 200, which represents one embodiment of the communications system 100 of FIG. 1. In the illustrated embodiment, the host and user transceivers 105, 110 (see FIG. 1) are DMT ADSL modems 205, 210. In one embodiment, the host modem 205 may be located at a central office (CO) of a service provider and the user modem 210 may be located at customer premises (CP). The host modem 205 generates the tones necessary for compatibility with the user modem 210. The host and user modems 205, 210 communicate with each other using a certain number of these tones for data transmission. Although the host and user modems 205, 210 have the capability of transmitting on all of the 256 allocated tones, they usually use only a portion of these tones for typical data transmissions. This generally results because most applications that are run by the user at the CP will not require the peak 8 MBPS capacity typically offered by the ADSL DMT modems 205, 210. The capacity offered by the ADSL DMT modems 205, 210 depends, of course, on the quality (i.e., the clarity) of the communication channel and whether all 256 tones are usable by the modems 205, 210.

The host and user modems 205, 210 include control blocks 215, 217, transmit blocks 220, 222, receive blocks 225, 227, and error blocks 230, 232, respectively. The control, transmit, and receive blocks 215, 220, 225 of the host modem 205 are described below in more detail with reference to FIG. 3. The error blocks 230, 232 provide error correction for the modems 205, 210, respectively. Generally, in the host and user modems 205, 210, (data) bits are allocated to different carriers according to a "loading" algorithm, such as the Water Filling (WF) algorithm or Equal Energy Distribution (EED) algorithm, for example. The aforementioned loading algorithms utilize the signal-to-noise ratio (SNR) profile of a channel and a desired SNR margin to allocate bits. In general, carriers with higher SNR values are able to carry more bits than those with lower SNR values. Typically, increasing the desired margin reduces the number of bits that can be carried by a given carrier. Although not so limited, in one embodiment, the control, transmit, receive, and error blocks 215, 220, 225, 230 of the host modem 205 may be similar to the respective control, transmit, receive, and error blocks 217, 222, 227, 232 of the user modem 210.

The host and user modems 205, 210, via the error blocks 230, 232, respectively, are able to achieve a higher throughput by boosting the SNR (i.e., the "coding gain") of the carriers so that more bits can be allocated to each carrier that is utilized for data transmission. One popular method for providing a gain in the SNR of a carrier is Trellis Coded Modulation (TCM) algorithm. The counterpart to the TCM is a Viterbi decoder (not shown), which is generally located at the peer station. The term "peer station," as utilized herein, refers to the modems 205, 210 receiving the transmitted information. Accordingly, in a two-way communication between the two ADSL modems 205, 210, either the host modem 205 or user modem 210 may be the peer station, depending on which one is receiving the information at a given time. In the illustrated embodiment, the error blocks 230, 232 provide the TCM, as well as Viterbi decoding, for the host and user modems 205, 210, respectively. Accordingly, the error blocks 230, 232 are capable of demodulating a trellis coded modulated signal.

Figure 3:
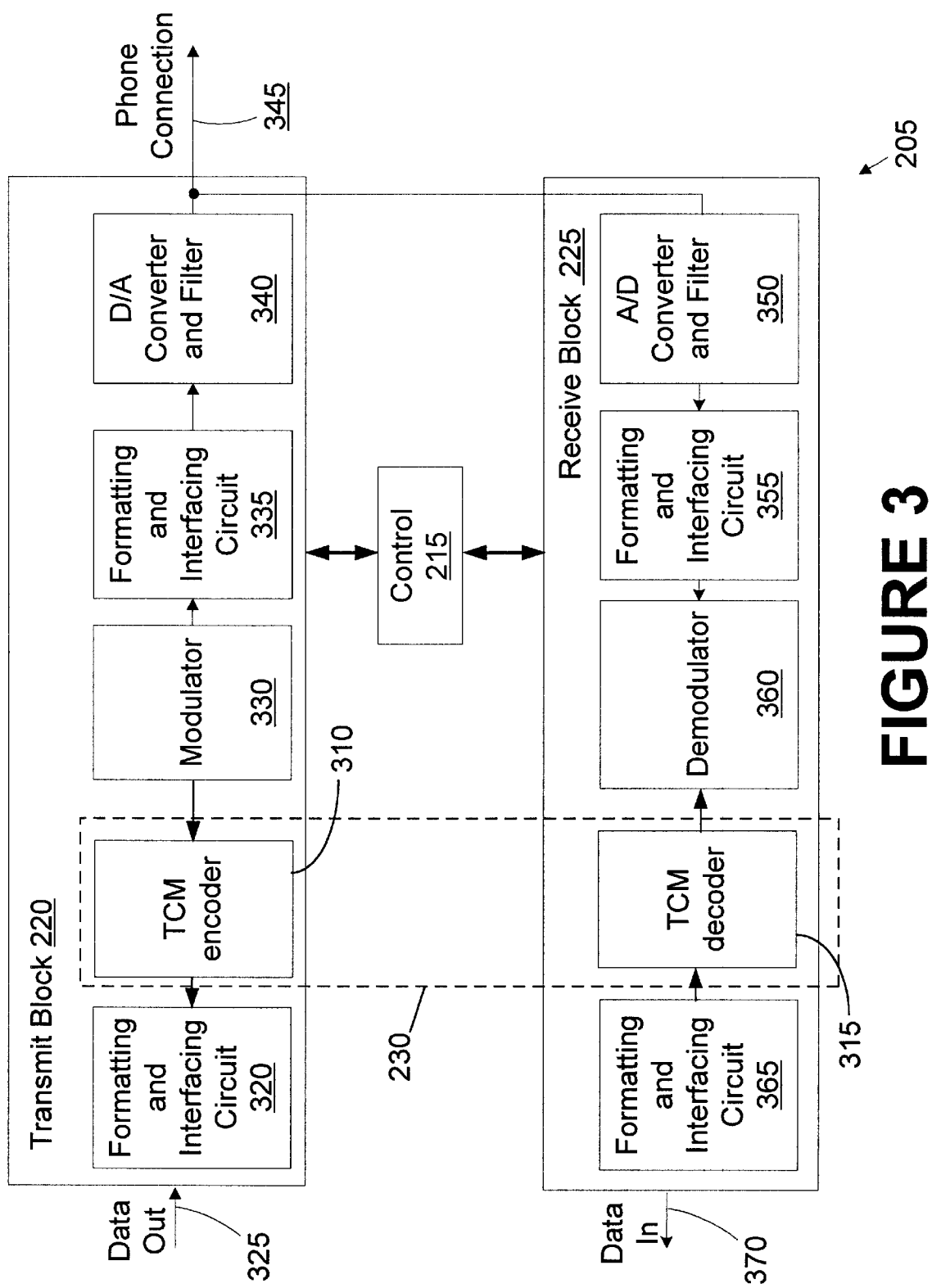
FIG. 3 illustrates a stylized block diagram of a host and user modem of the communications system of FIG. 2 in accordance with the present invention.

Turning now to FIG. 3, a block diagram of one embodiment of the host modem 205 of FIG. 2 is provided. For clarity and ease of illustration, not all functional blocks are illustrated in detail since these items are known to one of ordinary skill in the art, and are further defined in documents such as the aforementioned ANSI T1.413 Issue 2 standard. The host modem 205 typically includes a larger number of tones dedicated for transmitting data (downstream tones) and fewer tones for receiving data (upstream tones). Conversely, the user modem 210 (see FIG. 2) typically includes a larger number of tones dedicated for receiving data and fewer tones for transmitting data.

The host modem 205 includes the transmit and receive functional blocks 220, 225, as well as the control block 215 to control their functions. The host modem 205 also includes the error control block 230, which, in the illustrated embodiment, comprises a TCM encoder 310 and a TCM decoder 315. The TCM encoder provides Trellis Coded Modulation, and the TCM decoder demodulates the TCM signal. The transmit block 220 includes a formatting and interfacing circuit 320 adapted to receive outgoing digital data over a data out line 325. The formatting and interfacing circuit 320 performs functions such as cyclic redundancy checking (CRC), scrambling, and interleaving. As stated above, these functions are known to those of ordinary skill in the art, and are fully disclosed in the ANSI T1.413 Issue 2 standard.

The transmit block 220 also includes a modulator 330. The modulator 330 receives data from the formatting and interfacing circuit 320, performs tone ordering, constellation encoding, and gain scaling functions in accordance with the number of available tones, and modulates the tone carriers with the transmitted data. Trellis Coded Modulation may be performed at this point. A second data formatting and interfacing circuit 335, within the transmit block 220, inserts a cyclic prefix to the output of the modulator 330. The formatting and interfacing circuit 335 also buffers the output samples. A digital-to-analog (D/A) converter and filter 340 converts the digital output samples from the formatting and interfacing circuit 335 to an analog waveform suitable for transmission over a phone connection 345. The phone connection 345 couples between the user and host modems 205, 210.

The receive block 225 includes an analog-to-digital (A/D) converter and filter 350 that receives an analog waveform over the phone connection 345 and samples the analog waveform to generate a digital signal. A formatting and interfacing circuit 355 performs functions known in the art, such as frame alignment and time domain equalization. In time domain equalization, because the tones are at different frequencies, certain frequencies travel faster than others. As such, all the tones do not arrive at the same time. The time domain equalization function of the formatting and interfacing circuit 355 delays the faster tones to compensate for the propagation speed differences. The formatting and interfacing circuit 355 also performs gain control to increase the amplitude of the received signal.

A demodulator 360 receives digital signal data from the formatting and interfacing circuit 355 and converts the time domain data from the formatting and interfacing circuit 355 to frequency domain data to recover the tones. The demodulator 360 performs a slicing function to determine constellation points from the constellation encoded data, a demapping function to map the identified constellation points back to bits, and a decoding function (e.g., Viterbi decoding, if trellis constellation coding is employed). The demodulator 360 also performs tone deordering to reassemble the serial bytes that were divided among the available tones. A second formatting and interfacing circuit 365 in the receive block 225 performs CRC checking and descrambling functions on the data received from the demodulator 360. The reconstructed data provided by the formatting and interfacing circuit 365 represents the sequential binary data that was sent by the "interfacing" modem 205, 210. The reconstructed data is provided to a "data in" line 370.

The control block 215 controls the functions of the transmit and receive blocks 220, 225. Additionally, the control block 215 is capable of monitoring the traffic pattern of the user modem 210. The control block 215 is also capable of initiating a training procedure with the user modem 210, a process described in more detail below.

Figure 4:
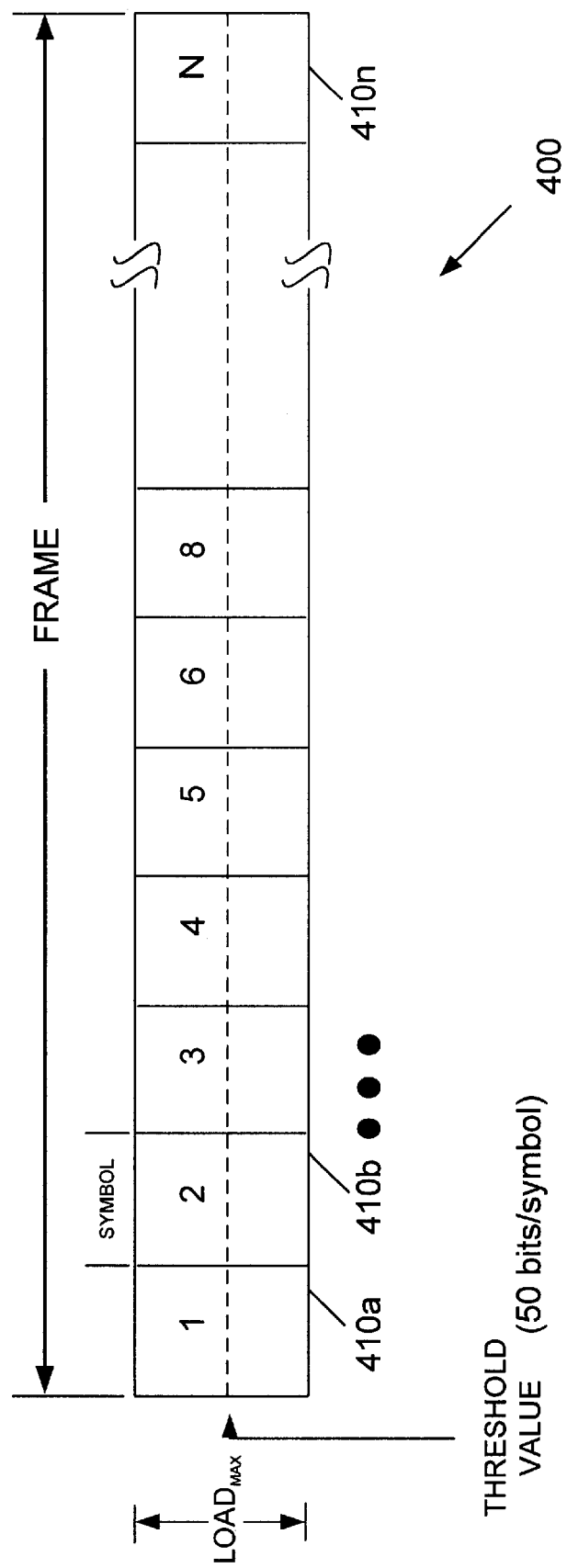
FIG. 4 depicts a standard DMT frame utilized for data communications between the host and user modems of FIG. 3.

FIG. 4 illustrates a typical frame 400 that is utilized by the DMT ADSL host modem 205 to convey information to its peer station, the user modem 210. The DMT frame 400 includes a plurality of symbols 410($a$–$n$), where each symbol 410($a$–$n$) is capable of carrying a maximum number of bits, $LOAD_{MAX}$. The term "symbol" herein refers to a set of time domain samples produced by the IFFT modulator 330. These include the cyclic prefix, and, for the downstream case, in full-rate host and user modems 205, 210, the number of samples equal 544 (i.e., 512+32). A new symbol is output every 250 $\mu$s (at a rate of 4000 per second). A symbol carries a total bit load equal to the sum of the numbers of bits used to modulate each carrier. The symbol is a supposition of all the modulated carriers. For a given connection, the number of bits carried by each carrier of the symbol 410($a$–$n$) is negotiated during a training procedure. And generally, each symbol 410($a$–$n$) carries the same number of bits, which means each symbol 410($a$–$n$) carries the same amount of load up to the maximum allowable load, $LOAD_{MAX}$. Furthermore, for a given channel having a particular SNR profile, we can define an associated TCM coding-gain threshold value (CTV) as the maximum number of bits that can be carried without the use of TCM. Carriers having a load that exceeds the CTV require the coding gain provided by TCM. Accordingly, if the load of the symbol 410($a$–$n$) exceeds the CTV, then the carriers for that symbol 410($a$–$n$) require TCM before transmission and Viterbi decoding at the time of reception. For illustrative purposes, it is assumed that the $LOAD_{MAX}$ in the instant embodiment is 120 bits per symbol, and the CTV is 50 bits per symbol. In a single user situation, all symbols carry the same load.

Figure 5:
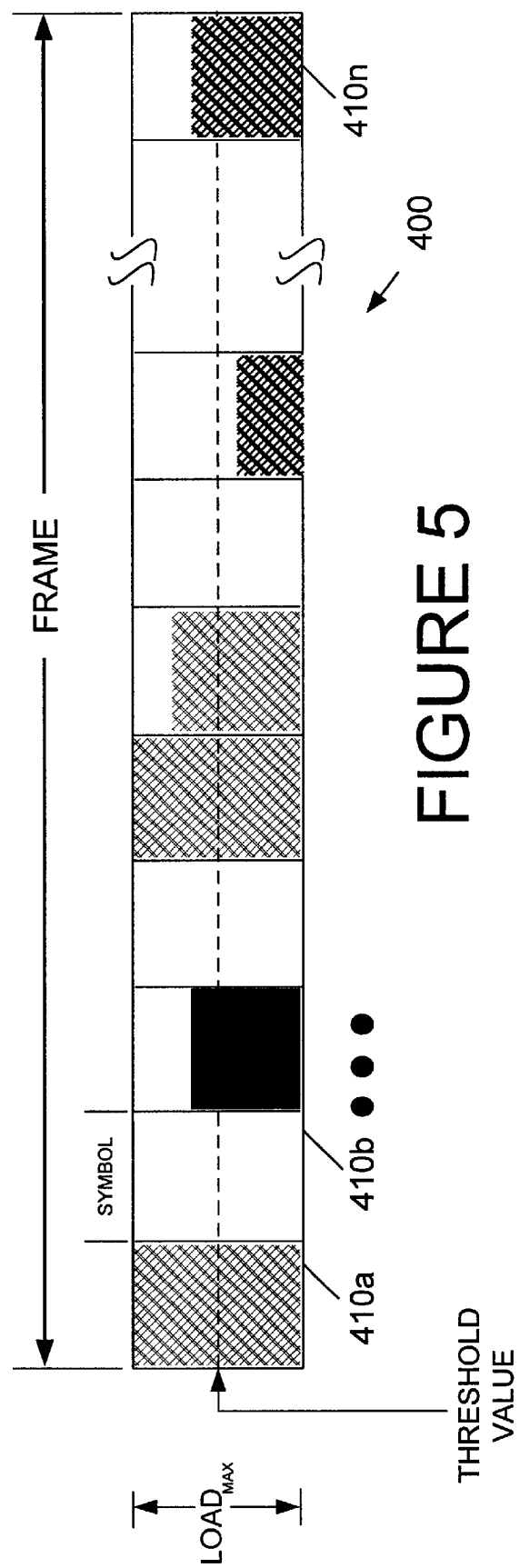
FIG. 5 illustrates an exemplary utilization of the DMT frame of FIG. 4.

FIG. 5 illustrates one example of the frame 400 utilization, wherein some symbols 410($a$–$n$) are fully loaded, some are partially empty, while others are completely empty. In the illustrated embodiment, it is assumed that the host and the user modems 205, 210 negotiate a bit rate that supports the maximum load of 120 bits per symbol. The empty symbols (e.g, 410$b$) and the partially empty symbols (eg., 410$n$) may be due to the fact that the user modem 210 may not for the moment be operating at maximum rate. The empty and partially-empty symbols, in accordance with the ANSI T1.413 Issue 2 standard, may be packed with "dummy" bits such that each symbol carries the negotiated load of 120 bits per symbol. In the illustrated frame, symbols that carry a load that is more than the CTV require coding gain (i.e., trellis coding) on the transmitting end, Viterbi decoding on the receiving end.

Figure 6:
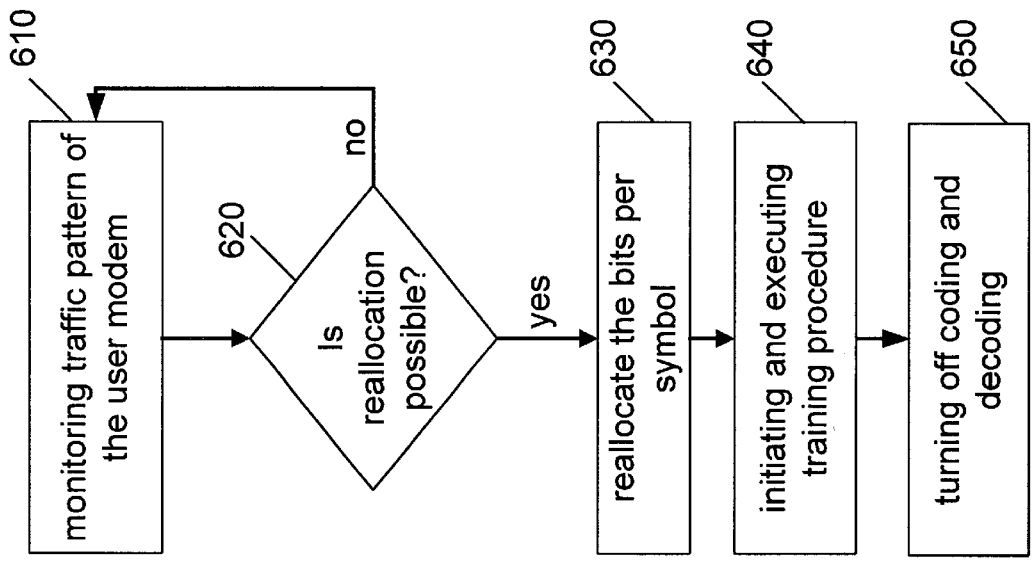
FIG. 6 depicts a flowchart of a method in accordance with the present invention that may be employed by the host transceiver of FIG. 1 and host modem of FIG. 2.

FIG. 6 illustrates a method in accordance with the present invention that may be utilized to reduce the processing power of the host and user modems 205, 210 during instances the two modems 205, 210 are operating at less than maximum capacity or less than the negotiated bit rate. Specifically, the method seeks to reduce the processing power by allocating the load transmitted over the frame 400 in a manner that substantially eliminates the need for coding gain on the transmitting end, and the need for Viterbi decoding on the receiving end.

The method of FIG. 6 begins at block 610, where the control block 215 of the host modem 205 monitors traffic pattern of the user modem 210. At block 620, the control block 215 of the host modem 205 determines if it is possible to reallocate bits such that the load per symbol 410($a$–$n$) is under the CTV. In one embodiment, determining if bits may be reallocated is based on whether the usage drops below the negotiated level (i.e., at least one symbol 410($a$–$n$) is empty or partially empty and is packed with dummy bits). For example, assuming the frame 400 of FIG. 5 includes an adequate number of empty or partially empty symbols 410($a$–$n$), it may be possible to reallocate the data over the frame 400 in such a manner that the load per symbol 410($a$–$n$) is under the CTV. In one embodiment, the control block 215 of the host modem 205 may calculate the traffic pattern (i.e., data flow) to/from the user modem 210 based on the actual data (i.e., after the idle cells have been removed). If it is possible to reallocate the bits, at block 630, the control block 215 re-computes the number of bits per carrier per each symbol 410($a$–$n$). At block 640, the host modem 205 communicates the new bit rate to the user modem 210 by initiating and executing a new bit loading procedure. Through the bit loading procedure, the user modem 210 ascertains the new bit rate per symbol 410($a$–$n$). At block 650, the host and user modems 205, 210 turn off the TCM coding and Viterbi decoding.

Figure 7:
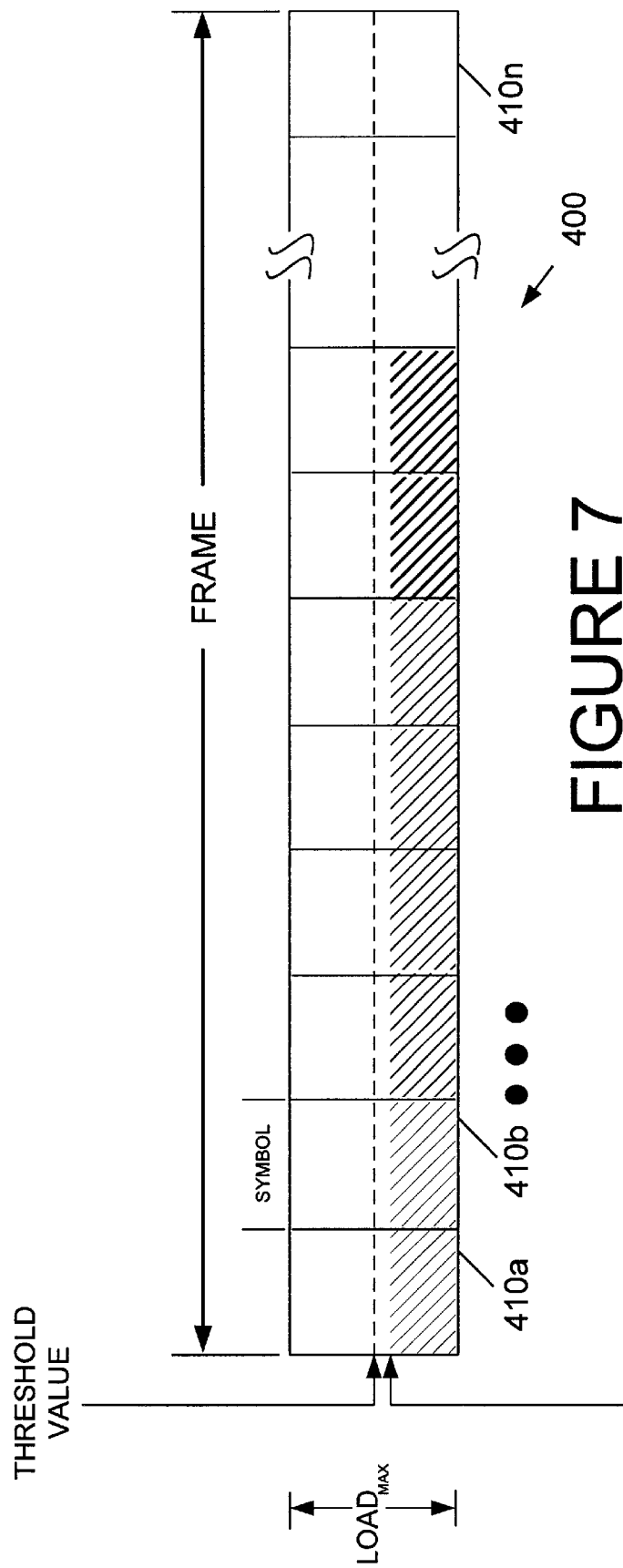
FIG. 7 illustrates an exemplary reallocation of data within the DMT frame of FIG. 4 in accordance with the present invention.

FIG. 7 illustrates an exemplary allocation of data within the frame 400 in accordance with the method of FIG. 6 of the present invention. As shown, the control block 215 reallocates bits such that the load per symbol 410($a$–$n$) is less than the CTV. As mentioned above, the user modem 210 ascertains the new bit rate through a new bit loading procedure. For illustrative purposes, the new bit rate negotiated by the host modem 205 with the user modem 210 is assumed to be 40 bits per symbol. Because the load carried by the symbols 410($a$–$n$) is less than the CTV, the host modem 205 and the user modem 210 do not require trellis coding or Viterbi decoding, respectively, thereby conserving power in the host and user modems 205, 210.

It is contemplated that, in an alternative embodiment, the method of FIG. 6 may be initiated and implemented by the user modem as well. That is, the control block 217 of the user modem 210, at the block 610, monitors its own traffic pattern with respect to the host modem 205. At the block 620, the control block 217 of the user modem 210 determines if it is possible to reallocate bits such that the load per symbol 410($a$–$n$) is under the CTV. In one embodiment, determining if bits may be reallocated is based on whether the usage drops below the negotiated level (i.e., at least one symbol 410($a$–$n$) is empty or partially empty and is packed with dummy bits). If it is possible to reallocate the bits, at the block 630, the control block 217 re-computes the number of bits per carrier per each symbol 410($a$–$n$). At the block 640, the user modem 210 communicates the new bit rate to the host modem 205 by initiating and executing a training procedure. After the training procedure, the host and user modems 205, 210 communicate at the new bit rate per symbol 410($a$–$n$).

Figure 8:
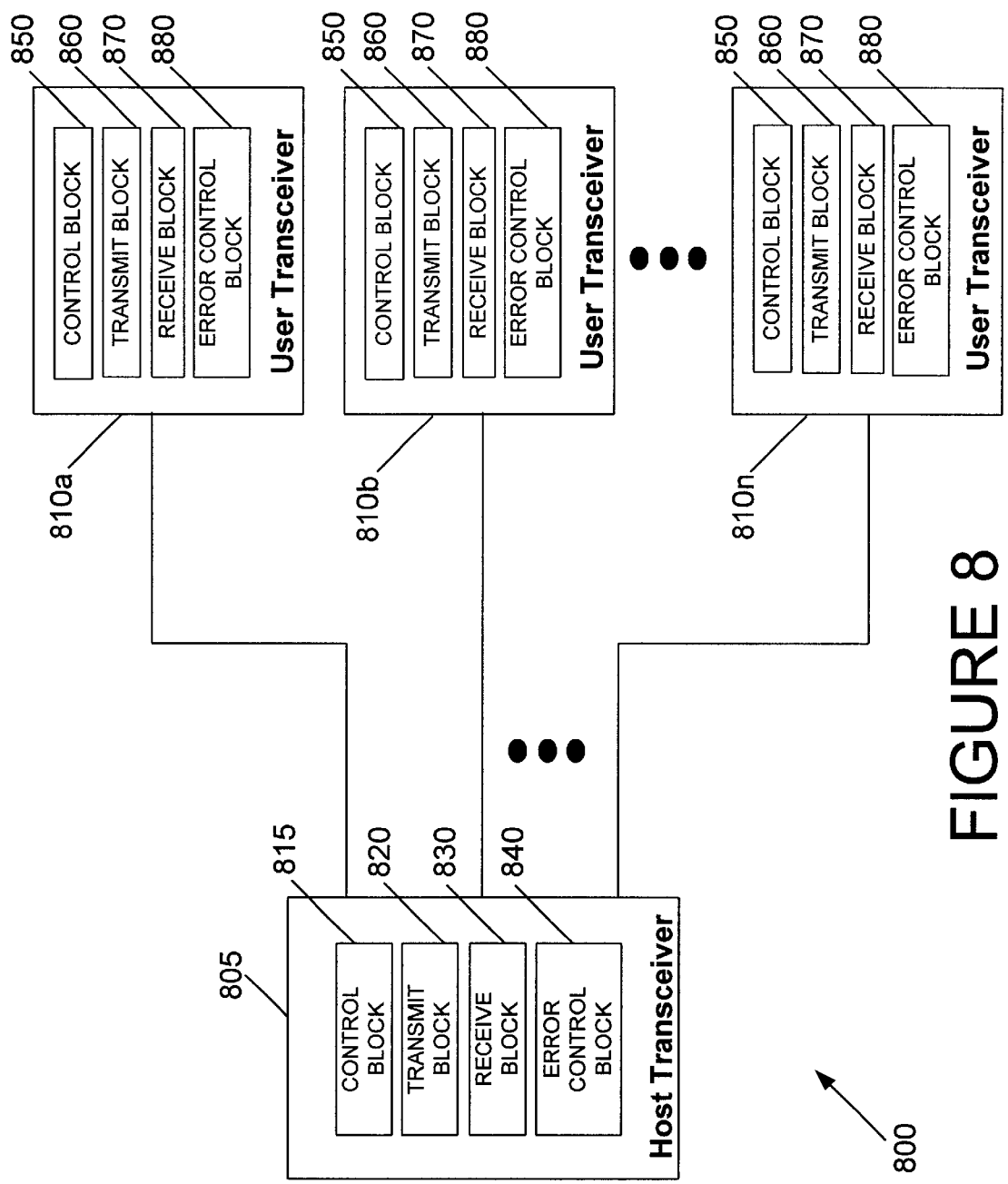
FIG. 8 depicts a stylized block diagram of an alternative embodiment of the communications system of FIG. 1 in accordance with the present invention.

In an alternative embodiment, the method of FIG. 6 may be employed in a communications system 800 shown in FIG. 8. The communications system 800 of FIG. 8 includes a host transceiver 805 capable of supporting a plurality of user transceivers 810($a$–$n$) through the use of time division multiplex. In one embodiment, the host transceiver 805 and user transceivers 810($a$–$n$) may be ADSL modems. The host modem 805 may be located in the central office of a telephone service provider, and the user modems 810($a$–$n$) may be located in customer premises, which could include homes, businesses, or the like. An example of the host modem 805 capable of supporting a plurality of user modems 810($a$–$n$) via multiplexing is described in a U.S. application, Ser. No. 09/236,122 entitled "Multi-tone Transceiver With Multiple Users," filed on Jan. 22, 1999, incorporated herein by reference in its entirety.

The host modem 805 includes a control block 815, a transmit block 820, a receive block 830, and an error control block 840. The control block 815 utilizes the transmit and receive blocks 820, 830 to communicate simultaneously with a plurality of user modems 810($a$–$n$). The error control block 840 provides error correction for the host modem 805. Each user modem 810($a$–$n$) includes a control block 850, a transmit block 860, a receive block 870, and an error control block 880. The control block 850 controls the functionality of the transmit and receive blocks 860, 870. The error control block 880 provides error correction for each user modem 810($a$–$n$). Although not so limited, in one embodiment, the transmit, receive, and error control blocks 860, 870, 880 of the user modems 810($a$–$n$) may be similar to the respective transmit, receive, and error control blocks 820, 830, 840 of the host modem 805.

Figure 9:
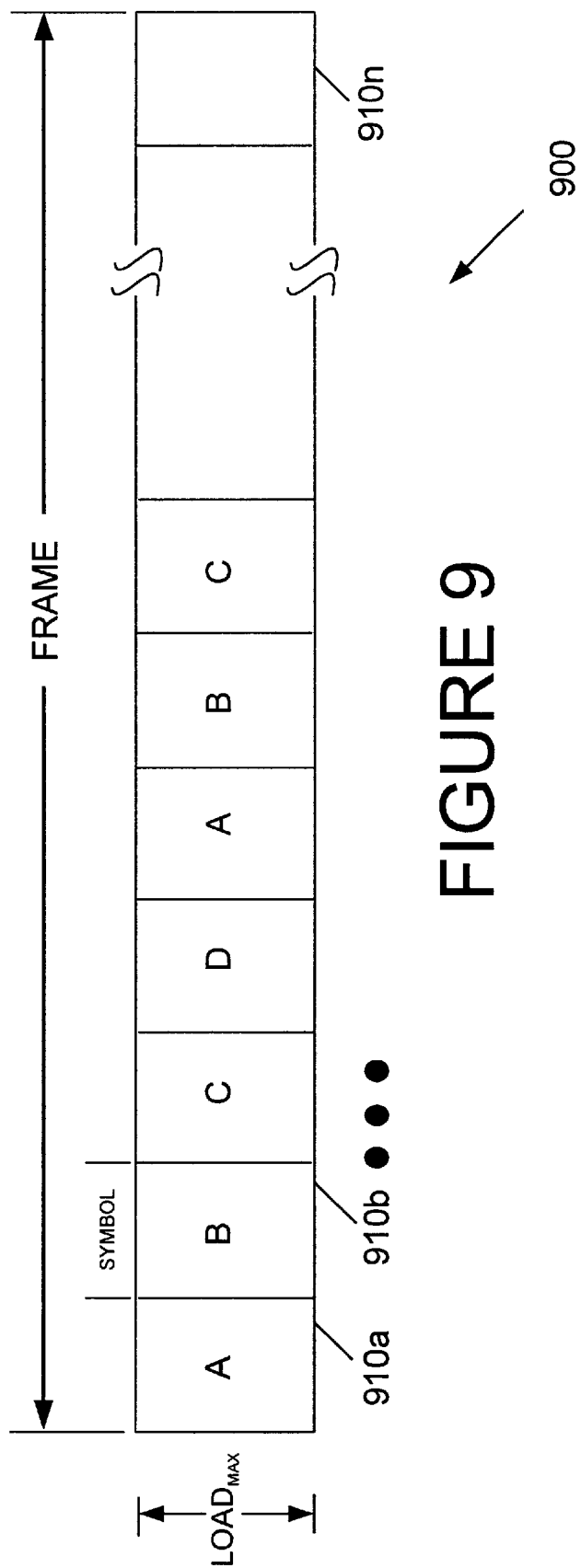
FIG. 9 illustrates a DMT frame that may be utilized for data communications by the host and user modems of the communications system of FIG. 8.

FIG. 9 illustrates a typical ADSL TDM frame 900, comprising a plurality of symbols 910($a$–$n$) that may be utilized by the host modem 805 for data communications to support a plurality of user modems 810($a$–$n$). In accordance with the present invention, the host modem 805 allocates a selected number of symbols 910($a$–$n$) of the TDM frame 900 to each user modem 810($a$–$n$) seeking a connection to the host modem 805. For illustrative purposes, it is assumed that four user modems 810($a$–$d$) seek a connection to the host modem 805. FIG. 9 illustrates one example of allocating the symbols of the DMT frame for servicing four user modems 810($a$–$d$). The letters "A" through "D," as utilized herein, represent the symbols of the DMT frame 900 that are allocated to the four user modems 810($a$–$d$). Accordingly, the symbols identified by an "A" (e.g., 910$a$) are allocated to the first user modem 810, the symbols identified by a "B" (e.g., 910$b$) are allocated to the second user modem 810$b$, and so forth. Although, the instant embodiment illustrates four users, it is contemplated that additional or fewer user modems 810($a$–$n$) can be supported by allocating the available symbols of the DMT frame 900 amongst the user modems 810($a$–$n$) seeking to connect to the host modem 805.

In the illustrated embodiment of FIG. 9, all four users are serviced by the host modem 805 at equal symbol rates. That is, the symbols 910($a$–$n$) of the DMT frame 900 are shared equally by all four user modems 810($a$–$d$) for a given cycle. It is contemplated that in alternative embodiments the symbol rate may be allocated to each user modem 810($a$–$d$) based on a variety of priority schemes, for example, such as those disclosed in the above-referenced U.S. application, entitled "Multi-tone Transceiver With Multiple Users."

Generally, based on a priority scheme, the control block 815 of the host modem 805 determines the number of symbols 910(*a–n*) to allocate per user modem 810(*a–n*) when multiple user modems 810(*a–n*) seek to be serviced by the host modem 805. The allocation of symbols 910(*a–n*) to a particular user modem 810(*a–n*) may be a dynamic process. Once at least one symbol 910(*a–n*) of the DMT frame 900 is allocated to the user modem 810(*a–n*), the host modem 805 initiates a training procedure with that user modem 810(*a–n*). During the training procedure, the user modem 810(*a–n*) ascertains which symbol or symbols, if more than one is allocated per frame, will be utilized for communication.

FIGS. 10*a* and 10*b* illustrate an example of the frame 900 utilization, wherein only the first user modem (e.g., user A) 810*a* and the third user modem (e.g., user C) 810*c* are communicating with the host modem 805. That is, the frame 900 has empty symbols (e.g., 910*b*) because the second and fourth user modems 810*b*, 810*d* are inactive. For illustrative purposes, it is assumed that the host modem 805 negotiates a bit rate of 80 bits per symbol with the first user modem 810*a* and a bit rate of 120 bits per symbol with the third user modem 810*c*. The load of the symbols (e.g., 910*a*, 910*c*, etc.) allocated for communication with the first and third user modems 810*a*, 810*c* may be fully loaded, partially empty, or completely empty, depending on the amount of traffic between the user modems 810*a*, 810*c* and the host modem 805. In one embodiment, the empty or partially empty symbols may be packed with "dummy" bits such that each symbol carries the load according to the negotiated bit rate. In the illustrated frame 900, because the negotiated bit rates for the first and third modems 810*a*, 810*c* are 80 bits per symbol and 120 bits per symbol, respectively, each symbol carries a load that is more than the CTV and thus requires coding gain (e.g., trellis coding) on the transmitting end, and decoding gain (e.g., Viterbi decoding) on the receiving end.

FIG. 6 illustrates the method that may be employed by the communications system 800 of FIG. 8 to reduce the processing power of the host and user modems 805, 810(*a–n*). Specifically, the method seeks to reduce the processing power by allocating the load transmitted over the available symbols 910(*a–n*) within frame 900 in a manner that substantially eliminates the need for trellis coding on the transmitting end, and the need for Viterbi decoding on the receiving end. At the block 610, the control block 815 of the host modem 805 monitors the traffic pattern of the user modems 810(*a–n*). At the block 620, the control block 815 of the host modem 805 determines if it is possible to reallocate the data over the available symbols 910(*a–n*) such that the load per symbol 910(*a–n*) is under the CTV for at least one of the user modems 810(*a–n*) that is communicating with the host modem 805. In one embodiment, determining if the bits may be reallocated is based on whether the usage of one of the user modems 810(*a–n*) drops below the negotiated level (i.e., at least one symbol 910(*a–n*) is empty or partially empty and is packed with dummy bits). In an alternative embodiment, determining if the bits may be reallocated is based on the presence of unutilized symbols (e.g., 910*b*) (see FIG. 9) within the frame 900. One reason unutilized symbols may exist is because some users may, for the moment, be inactive, as is the case in FIG. 10, where only two out of four users are active. If no unutilized symbols exist within the frame 900, then the determination of reallocating bits may be based on a priority scheme. The priority scheme in one embodiment may be based on a class of ADSL service offered by a service provider. For example, some users may desire a cheaper ADSL service that provides lower "average" data rates during peak times, while others may desire a more expensive ADSL service that offers higher "average" data rates during peak times. Based on the priority scheme, the control block 815 may adjust the data rate of a user having a lower class of ADSL service to a lower data rate to free symbols 910(*a–n*) for the benefit of a user having a higher class of ADSL service. The freed symbols 910(*a–n*) may then be utilized for reallocating the data such that the load per symbol is below the CTV. If it is possible to reallocate the bits for a given user modem 810(*a–n*), at the block 630, the control block 815 re-computes the number of bits per carrier per each symbol 810(*a–n*). At the block 640, the host modem 805 communicates the new bit rate to the appropriate user modem 810(*a–n*) via the bit loading procedure. At the block 650, the host modem 805 and the user modems 810(*a–n*) turn off the TCM coding and Viterbi decoding.

FIG. 11 illustrates an exemplary allocation of data within the frame 900 in accordance with the method of FIG. 6 of the present invention. As shown, the control block 815 reallocates the bits such that the load per symbol 910(*a–n*) is less than the CTV, at least as it pertains to the first user (i.e., first user modem 810*a*). The first user modem 810*a* ascertains the new bit rate through the bit loading procedure initiated by the host modem 805. For illustrative purposes, the new bit rate ascertained by the first user modem 810*a* is assumed to be 40 bits per symbol. Because the load carried by the symbols 910(*a–n*) is less than the CTV, the host modem 805 and the first user modem 810*a* do not require trellis coding or Viterbi decoding, respectively, thereby conserving power in the host and user modems 805, 810 (*a–n*). Although FIG. 11 illustrates reallocation of data with respect to user "A," it is contemplated that the method of FIG. 6 may also be utilized to reallocate data for other users as well.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for delivering data within a frame to a peer station, the frame having at least a first and a second symbol, comprising:

determining whether the data in the first symbol is greater than or equal to a coding-gain threshold;

loading at least a portion of the data within at least the second symbol in response to determining the data in the first symbol is greater than or equal to the coding-gain threshold to provide a new frame;

transmitting the new frame, wherein transmitting the new frame includes first negotiating a new bit rate with the peer station before transmitting the modified frame; and deactivating Trellis Coding Modulation and Viterbi decoding.

2. The method of claim 1, further including preventing transmission of the new frame in response to traffic pattern of the peer station being at least equal to a bit rate negotiated with the peer station.

3. The method of claim 1, wherein transmitting the new frame includes transmitting data in the new frame at the new bit rate.

4. The method of claim 1, wherein loading at least the portion of the data within at least the second symbol includes loading at least the portion of the data in a manner that the data is equal or below the coding-gain threshold.

5. A method for delivering data within a frame to a peer station, the frame having at least a first and a second symbol, comprising:
   determining whether the data in the first symbol is greater than or equal to a coding-gain threshold;
   loading at least a portion of the data within at least the second symbol in response to determining the data in the first symbol is greater than or equal to the coding-gain threshold to provide a new frame; and
   transmitting the new frame; and
   wherein transmitting the new frame includes first negotiating a new bit rate with the peer station before transmitting the modified frame; and
   wherein determining whether the data in the first symbol is greater than or equal to the coding-gain threshold is in response to determining if the usage drops below a bit rate negotiated with the peer station.

6. The method of claim 1, wherein determining whether the data in the first symbol is greater than or equal to the coding-gain threshold is in response to determining at least one available symbol.

7. A method for delivering data within a frame to a peer station, the frame having at least a first and a second symbol, comprising:
   determining whether the data in the first symbol is greater than or equal to a coding-gain threshold;
   loading at least the portion of the data within a plurality of symbols in a manner that data in at least one of the plurality of symbols is equal or below the coding-gain threshold; and
   transmitting the new frame; and
   wherein transmitting the new frame includes first negotiating a new bit rate with the peer station before transmitting the modified frame; and
   wherein loading at least the portion of the data within a plurality of symbols comprises apportioning the portion of the data equally within the plurality of symbols.

8. An apparatus for delivering data to a peer station within a frame having at least a first and a second symbol, the apparatus comprising:
   a control logic capable of:
      determining whether the data in the first symbol is greater than or equal to a coding-gain threshold; and
      loading at least a portion of the data within at least the second symbol in response to determining the data in the first symbol is greater than or equal to the coding-gain threshold to provide a new frame;
   a transmitter capable of transmitting the new frame; and
   an error control block capable of providing Trellis coding and Viterbi decoding, wherein the control logic is capable of controlling the error control block to terminate Trellis Coding Modulation and Viterbi decoding.

9. The apparatus of claim 8, wherein the control logic is capable of negotiating a new bit rate with the peer station.

10. The apparatus of claim 8, wherein the control logic is capable of preventing transmission of the new frame in response to traffic pattern of the peer station being at least equal to a bit rate negotiated with the peer station.

11. The apparatus of claim 8, wherein the control logic is capable of loading at least the portion of the data within at least the second symbol includes loading at least the portion of the data in a manner that the data is equal or below the coding-gain threshold.

12. An apparatus for delivering data to a peer station within a frame having at least a first and a second symbol, the apparatus comprising:
   a control logic capable of:
      determining whether the data in the first symbol is greater than or equal to a coding-gain threshold; and
      loading at least a portion of the data within at least the second symbol in response to determining the data in the first symbol is greater than or equal to the coding-gain threshold to provide a new frame; and
   a transmitter capable of transmitting the new frame; and
   wherein the control logic is capable of determining whether the data in the first symbol is greater than or equal to the coding-gain threshold is in response to determining if the usage drops below a bit rate negotiated with the peer station.

13. The apparatus of claim 8, wherein the control logic is capable of determining whether the data in the first symbol is greater than or equal to the coding-gain is responsive to the control logic determining at least one available symbol.

14. An apparatus for delivering data to a peer station within a frame having at least a first and a second symbol, the apparatus comprising:
   a control logic capable of:
      determining whether the data in the first symbol is greater than or equal to a coding-gain threshold; and
      loading at least a portion of the data within at least the second symbol in response to determining the data in the first symbol is greater than or equal to the coding-gain threshold to provide a new frame; and
   a transmitter capable of transmitting the new frame; and
   wherein the control logic is capable of loading at least the portion of the data within at least the second symbol includes loading at least the portion of the data within a plurality of symbols in a manner that data in at least one of the plurality of symbols is equal or below the coding-gain threshold; and
   wherein the control logic is capable of loading at least the portion of the data within a plurality of symbols comprises apportioning the portion of the data equally within the plurality of symbols.

15. The apparatus of claim 8, further including a receiver capable of receiving data within a frame from the peer station.

16. The apparatus of claim 8, the first and second symbols comprising a plurality of carriers, the apparatus further including an error control block capable of providing a coding gain for the plurality of carriers within the first and second symbols.

17. The apparatus of claim 16, further including a gain decoder capable of decoding the coding gain of the plurality of carriers within the first and second symbols.

* * * * *